(12) United States Patent
Yamaji et al.

(10) Patent No.: US 6,539,827 B2
(45) Date of Patent: Apr. 1, 2003

(54) APPARATUS AND METHOD FOR DISCHARGING CHIPS FROM A LATHE

(75) Inventors: Ryoichi Yamaji, Houston, TX (US); Toshio Yato, Houston, TX (US)

(73) Assignee: Japan Machine Tools, Corp., Houston, TX (US)

( * ) Notice: Subject to any disclaimer, the term of this patent is extended or adjusted under 35 U.S.C. 154(b) by 0 days.

(21) Appl. No.: 09/803,746

(22) Filed: Mar. 9, 2001

(65) Prior Publication Data

US 2001/0023628 A1 Sep. 27, 2001

Related U.S. Application Data

(60) Provisional application No. 60/188,769, filed on Mar. 13, 2000.

(51) Int. Cl.[7] .............................. B23B 1/00; B23B 3/00
(52) U.S. Cl. ................. 82/1.11; 82/50; 82/52; 82/173
(58) Field of Search .......................... 82/1.11, 901, 173, 82/50, 52, 117, 142, 147, 168; 408/56, 59; 409/231, 233, 137

(56) References Cited

U.S. PATENT DOCUMENTS 5,544,985 A * 8/1996 Lane ........................ 408/56
6,270,295 B1 * 8/2001 Hyatt et al. ................ 408/1 R

FOREIGN PATENT DOCUMENTS

| EP | 0441170 A1 | * | 9/1991 | .............. 409/137 |
| EP | 0624429 A1 | * | 11/1994 | .............. 409/137 |

* cited by examiner

Primary Examiner—Henry W. H. Tsai
(74) Attorney, Agent, or Firm—Harrison & Egbert

(57) ABSTRACT

A method and apparatus for removing chips from a workpiece on a lathe including a spindle with a through hole formed therein, a chuck having a through hole formed therein and affixed adjacent a forward end of the spindle, a cutting mechanism cooperative with the chuck so as to remove metal chips from a workpiece mounted on the chuck, and a coolant line connected to the cutting mechanism and directed generally toward the through hole of the chuck so as to drive metal chips through the through hole of the spindle and outwardly of a rear end of the spindle. A guide sleeve is positioned within the through hole of the spindle so as to be fixed and nonrotatable therewithin. The coolant line includes a high pressure coolant line and a low pressure coolant line. The cutting system includes a turret with a cutting tool affixed to a station of the turret. The coolant line is connected to the turret and extends so as to have an outlet adjacent to the cutting tool. The coolant line delivers liquid toward the through hole of the spindle at a pressure of no less than 100 p.s.i.

9 Claims, 6 Drawing Sheets

APPARATUS AND METHOD FOR DISCHARGING CHIPS FROM A LATHE

RELATED APPLICATION

The present application claims priority from U.S. Provisional Patent Application No. 60/188,769, filed on Mar. 13, 2000, and entitled "Method and Device for Discharging Chips from Rear End of Main Spindle Through Hole", presently pending.

BACKGROUND OF THE INVENTION

1. Field of the Invention

The present invention relates to chip removal devices for lathes. More particularly, the present invention relates to the use of high pressure coolant systems for the removal of chips from the interior bore of a workpiece affixed to a chuck of a lathe.

2. Description of the Prior Art

A lathe is a machine for revolving a piece of material so as to enable a cutting tool to shape it into a component of circular cross-section or to perform a screw-cutting operation. Lathes, which are among the most common machine tools, vary widely in design. What they have in common is that the workpiece is given a rotational movement and the material is cut away by a tool that is given an appropriate combination of linear (axial and radial) movements.

FIG. 1 shows a center lathe, also known as an engine lathe. This is the most widely used type of lathe. The lathe 10 has a chuck 12 which holds a workpiece 14 therein. The rotational movement is imparted to the workpiece 14 by the work spindle 16 mounted in the head stock 18 of the lathe 10. To enable long bars to be accommodated, the work spindle 16 may be of a hollow construction. The end of this spindle 16 is threaded to take various chucks, such as chuck 12. The chucks are gripping devices which hold the workpiece, as required. The required speed of rotation of the spindle 16, and therefore the cutting speed of the tool 20, is controlled by a suitable selection of the transmission ratio of the main gear box. Mounted on the guideways of the lathe's bed 22 is the saddle (or carriage) 24. The saddle 24 carries the cutting tool 12 and is constructed as a compound slide. The saddle 24 moves in the longitudinal direction of the lathe 10. A cross slide 26 can be moved only in the transverse direction. Mounted on the cross slide 26 is the top slide 28. The top slide 28 can be moved longitudinally. It can also be swiveled about a vertical axis and clamped in any position as desired. The feed (advancing) and adjustment movements of the slides can be performed by means of crank handles on the saddle. Automatic control of the feed motion can be provided by means of the feed shaft, which receives its rotational movement from the work spindle 16. The feed shaft is provided with a worm which rotates with this shaft, but can slide longitudinally in relation to it.

At the opposite end of the lathe bed 22 from the head stock 18 is the tail stock 30. The tail stock 30 can move along the guideways and can be clamped in a desired position. The center sleeve in the tail stock can be moved in the longitudinal direction of the lathe 10 by means of a handwheel and screw spindle and can thus be brought toward the workpiece. The sleeve is provided with a tapered socket to take a center or a boring or reaming tool.

Threads are in widespread use as constructive elements in general mechanical engineering. These threads can be made in cylindrical or conical form. Chips are formed which correspond to the lead of such threads. These chips and shavings will wind up in a spiral configuration and be rather bulky. Usually, thread-cutting tools are equipped with the chip-breaker to prevent the formation of long continuous and bulky chips or shavings. Long, sharp and bulky chips or shavings are dangerous to the operator and cumbersome to handle. These chips will twist around the tool and cause damage to the cutting tool and workpiece. Chips or shavings broken by the chip-breaker are possibly treated safely and properly if they are formed during the external cutting process. However, if chips or shavings, which are broken by the chip-breaker, are formed during the internal cutting production, it is very difficult to remove them. They are pushed ahead by the cutting tool and stick inside the cylindrical or conical workpiece. In order to protect the cutting tool and workpiece against damage, the operator should stop the machine and remove them manually. This will result in less productivity. As a result, it is desirable to be able to remove the chips or shavings during the turning process. Such a system and device could be advantageous to the internal cutting production of parts.

During normal operations, the lathe operation must be stopped and the protective hood around the cutting operation must be opened. Conventionally, a worker will use a long rod to reach into the area within the interior of the workpiece so as to pull out the coiled chips. Subsequent to the removal of such chips, the rod must be removed, the protective door closed and the machining operation restarted. As can be understood, this is a very time consuming and labor-intensive process.

It is an object of the present invention to provide a method and apparatus for removing chips or shavings during the internal cutting production.

It is another object of the present invention to provide a method and apparatus for removing chips which allows the machining operation to be carried out on a continuous basis without interruption.

It is another object of the present invention to provide a method and apparatus for removing the chips or shavings during internal cutting production which protects the cutting tool and workpiece against damage.

It is still a further object of the present invention to provide a method and apparatus for removing chips which increases productivity and minimizes risk to the worker.

It is still a further object of the present invention to provide a method and apparatus for removing chips which is relatively inexpensive and easy to implement.

These and other objects and advantages of the present invention will become apparent from a reading of the attached specification and appended claims.

SUMMARY OF THE INVENTION

The present invention is a method and apparatus for removing chips from a lathe. As used herein, the term "chips" includes chips, shavings, and other metal particles which are removed during the internal metal cutting operations of a lathe.

The apparatus of the present invention includes a spindle having a through hole formed therein, a chuck having a through hole formed therein affixed adjacent a forward end of the spindle such that the through hole of the chuck is aligned with the through hole of the spindle, a cutting mechanism cooperative with the chuck so as to remove metals from a workpiece mounted on the chuck, and a coolant line connected to the cutting mechanism and directed generally toward the through hole of the chuck so as to drive metal chips through the through hole of the spindle and outwardly of the rear end of the spindle.

In the preferred embodiment of the present invention, a guide sleeve is positioned within the through hole of the spindle. The guide sleeve is fixed and nonrotatable. The spindle will rotate around the guide sleeve. The guide sleeve will extend from the forward end toward the rearward end of the spindle. A tapered sleeve is affixed within the through hole of the chuck and extends toward the end of the guide sleeve adjacent to the forward end of the spindle. This tapered sleeve has a wide end opening at the through hole of the chuck and a narrow end adjacent to the forward end of the spindle. This tapered sleeve will rotate with the rotation of the spindle.

In the present invention, the cutting system includes a turret and a cutting tool affixed to a station of the turret. The coolant line is connected to the turret and extends toward the cutting tool. The coolant line has an outlet adjacent to the cutting tool. A chip removal tool is affixed to another station of the turret. The coolant line has another outlet at the chip removal tool. The turret is rotatable such that the chip removal tool can be positioned adjacent to the through hole of the chuck.

In the present invention, the coolant line includes a high pressure coolant line, a low pressure coolant line, a reservoir, and a pump means connected to the reservoir for pumping a liquid from the reservoir selectively through one of the high pressure coolant line and the low pressure coolant line. The pump means serves to pass liquid through an outlet of the high pressure coolant line at no less than 1,000 p.s.i. The pump means also serves to pass liquid through an outlet of the low pressure coolant line at between 100 and 1,000 p.s.i.

A chip conveyor is positioned so as to receive chips discharged from the rear end of the spindle.

The present invention is also a method of removing chips produced during the cutting operations of a lathe comprising: (1) forming a through hole in a spindle of the lathe; (2) attaching a coolant line adjacent a cutting tool of the lathe so as to have an outlet directed generally toward the through hole of the spindle; (3) pumping coolant through the coolant line such that the coolant line releases liquid at a pressure of no less than 100 p.s.i.; (4) cutting chips by the cutting tool from the workpiece affixed to the chuck; and (5) driving the chips through the through hole of the chuck and through the through hole of the spindle by the liquid pressure from the coolant line. The chips are discharged from an end of the spindle opposite the chuck.

The step of cutting the chips includes rotating the spindle. The method of the present invention also includes affixing a guide sleeve within the through hole of the spindle such that the guide sleeve is stationary during the rotation of the spindle. The step of affixing a coolant line includes affixing a high pressure coolant line adjacent to the cutting tool and affixing a low pressure coolant line adjacent to the cutting tool. The step of pumping includes pumping liquid at a pressure of greater than 1,000 p.s.i. through the high pressure coolant line. The step of pumping also includes pumping liquid at a pressure of between 100 and 1,000 p.s.i. through the low pressure coolant line.

DETAILED DESCRIPTION OF THE INVENTION

Figure 1:
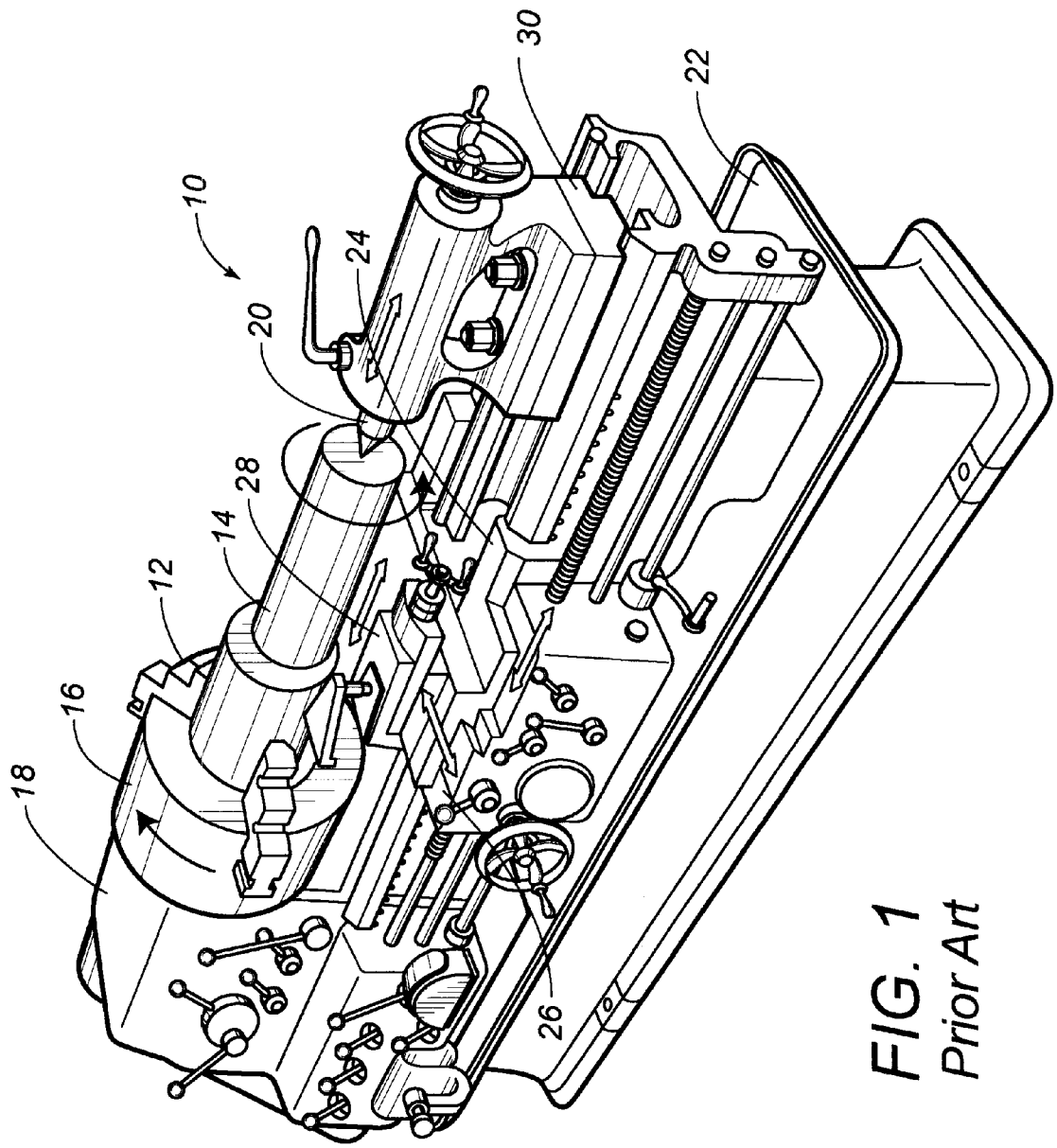
FIG. 1 is a perspective view of a prior art engine lathe.
Figure 2:
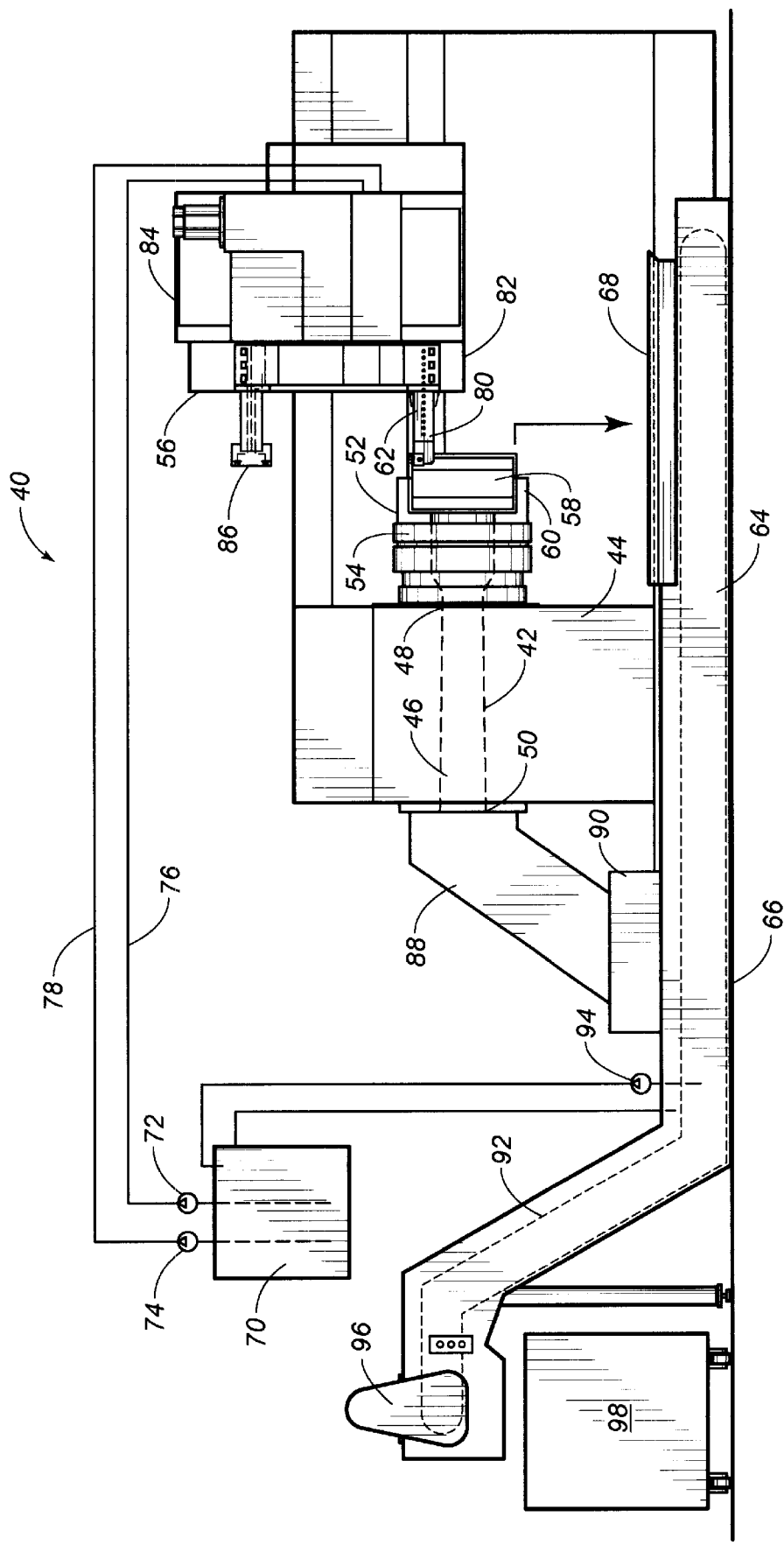
FIG. 2 is a diagrammatic side view of the apparatus of the present invention.

Referring to FIG. 2, there is shown at 40 the apparatus of the present invention for removing chips during the cutting operations of a lathe. In particular, the apparatus 40 includes a spindle 42 rotatably mounted within the lathe 44. The spindle 42 has a through hole 46 formed therein. The through hole 46 opens at a forward end 48 and at a rearward end 50. A chuck 52 has a through hole 54 formed therein. The chuck 52 is affixed adjacent to the forward end 48 of the spindle 42. The through hole 54 of the chuck 52 is aligned with the through hole 46 of the spindle 42. A cutting mechanism 56 is suitably mounted on the lathe 44 and is cooperative with the chuck 52 so as to remove metal chips from a workpiece 58 received within the jaws 60 of the chuck 52. A coolant line 62 is connected to the cutting mechanism 56. It is directed toward the through hole 54 of the chuck 52 and toward the through hole 46 of the spindle 42 so as to drive metal chips through the through holes 54 and 46 so that the metal chips can be discharged at the rear end 50 of the spindle 42.

In the present invention, the lathe 44 is mounted on a base 64 positioned on floor 66. A coolant discharge receptacle 68 is mounted within the base 64 so as to receive the residual coolant that would drain from the interior of the workpiece 58. A coolant reservoir 70 is illustrated diagrammatically in FIG. 2. The coolant reservoir 70 will include suitable pumps 72 and 74 for the purpose of passing the coolant liquid from the reservoir 70 as fluid flows through a high pressure coolant line 76 and a low pressure coolant line 78. The pump 72 is connected to the reservoir 70 so as to selectively pass coolant through the coolant line 78 so that the coolant is released from the outlet associated with the coolant line 62 at a pressure of over 1,000 p.s.i. Ideally, and preferably, the pressure of the liquid released through the high pressure coolant line 76 will be approximately 1,500 p.s.i. This great amount of pressure is required so as to properly drive the metal chips through the through hole 46 of the spindle 42.

The pump 74 is connected to the reservoir 70 so as to pass liquid through the low pressure coolant line 78 to other outlets associated with the coolant line 62. The low pressure coolant line 78, in combination with the pump 74, will selectively pass coolant so as to be released from an outlet at between 100 p.s.i. and 1,000 p.s.i. It is desired to pass coolant in an amount of fifteen gallons per minute through the outlets of the respective coolant lines 76 and 78. The high pressure coolant line is designed so as to create a greater "force" for pushing the metal chips through the through hole 46. The greater "flood" of liquid emitted by the low pressure coolant line 78 will serve for a wide area dispersion of force for the purpose of generally clearing the through hole 46 of any residual chips.

In FIG. 2, it can be seen that the cutting system 56 includes a threading and boring bar 80 which is connected to a station 82 of a turret 84. The turret 84 is slidably mounted on the lathe 44. The turret 84 is suitable for positioning various stations of tools in a desired position relative to the workpiece 54. The turret 84 can be suitably controlled by any numerical control (NC) apparatus or other processors.

Importantly, a chip removal tool 86 is affixed to another station of the turret 84. The chip removal tool 86 has a generally flat end with the outlets of the high pressure coolant line 76 and the low pressure coolant line 78 formed thereon. If a full and thorough flushing of any metal particles from the workpiece 54 is desired, then the turret 84 can be suitably rotated so that the chip removal tool 86 is positioned within the interior of the workpiece 58. Then the desired pressure can be applied by activating one of the pumps 72 and 74.

When the metal parts are flushed from the interior of the workpiece 58, they will pass through the through hole 54 of the chuck 52 and through the through hole 46 of the spindle 42. They will then pass outwardly from the discharge end 50 of the spindle 42 into a chute 88 and onto a dumper 90 associated with a discharge conveyor 92. The discharge conveyor 92 will allow any residual coolant to drain thereinto so that pump 94 can cause the coolant to be recirculated back to the reservoir 70 for further use. The various metal pieces associated with the chips or shavings are moved by the chip conveyor 92 upwardly to a discharge hopper 96 above a container 98. As such, the metal chips from the machining operation can be suitably removed from the workplace.

Figure 3:
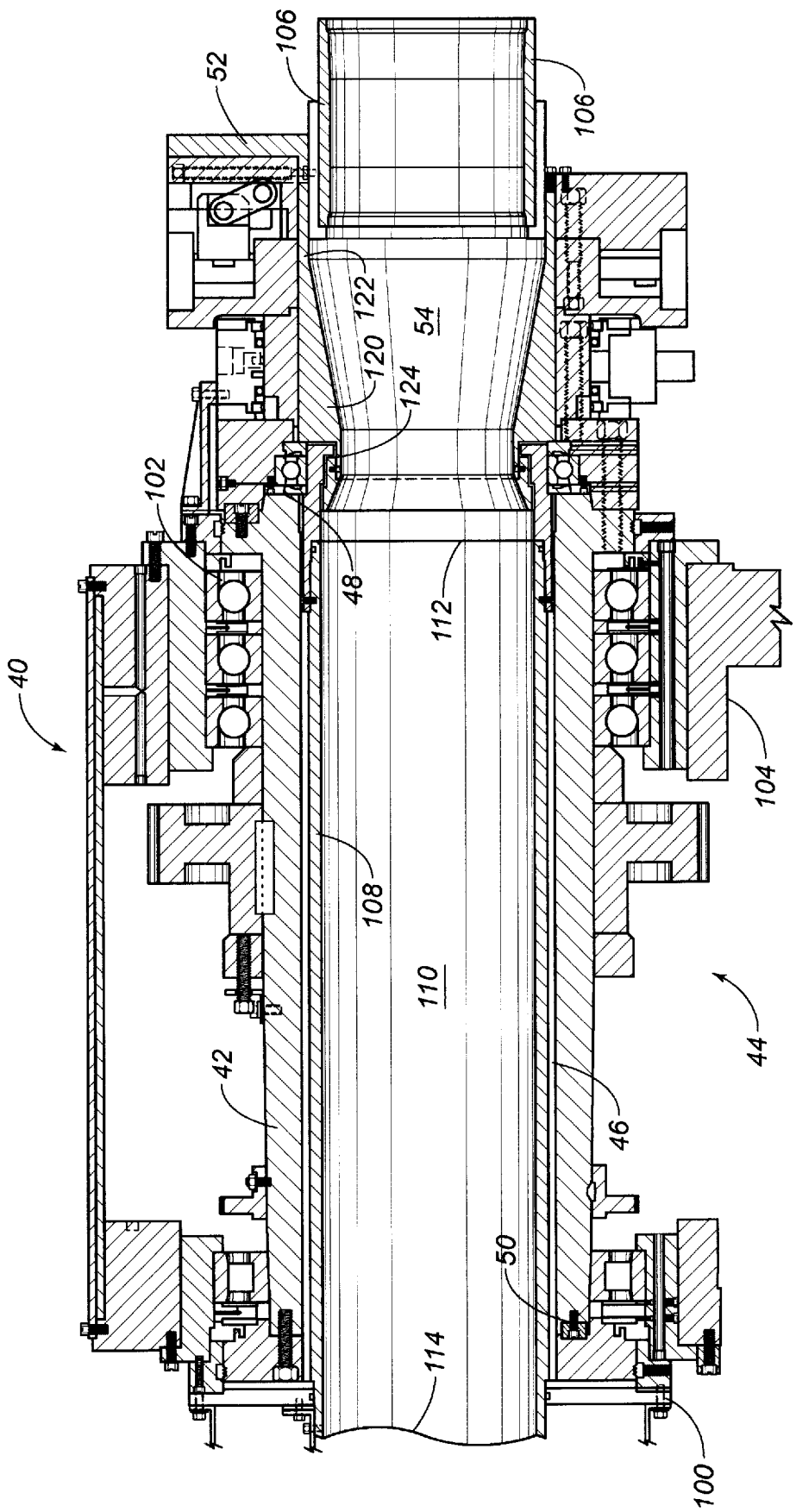
FIG. 3 is a cross-sectional view showing the apparatus of the present invention.

FIG. 3 shows the interior of the apparatus 40 associated with the present invention. In particular, the lathe 44 is shown as having spindle 42 rotatably mounted therein. Drive connections 100 are engaged with an end of the spindle 42 so as to impart rotational movement to the spindle 42. Suitable bearings 102 are included within the frame 104 of the lathe 44 so that the spindle 42 can suitably rotate relative to the rotational movement imparted by the drive connection 100. The spindle 42 is rotated in the same manner as spindles in conventional lathes. It can be seen that the chuck 52 is suitably connected to the forward end of the spindle 42. The chuck 52 will rotate with the spindle 42. The chuck 52 has suitable jaws 106 for engaging the workpiece therein. The chuck 52 has a through hole 54 formed therein. Similarly, the spindle 42 has a through hole 46 formed therein. The through hole 54 of the chuck 52 is axially aligned with the through hole 46 associated with spindle 42.

Importantly, in FIG. 3, it can be seen that a guide sleeve 108 is affixed within the through hole 46 of spindle 42. The guide sleeve 108 has interior passageway 110 extending therethrough. The guide sleeve 108 has a forward end 112 adjacent to the forward end 48 of spindle 42. The guide sleeve 108 has a rearward end 114 adjacent to the rear end 50 of the spindle 42. The guide sleeve 108 is mounted within the through hole 46 of spindle 42 so as to be nonrotatably positioned therein. Experiments with the present invention have suggested that when the spindle 42 rotates, certain metal pieces will cling to the wall of the spindle 42 by centrifugal force. Since the guide sleeve 108 does not rotate with the spindle 42, the "clinging" effect of centrifugal force will not occur. As such, chips produced during the machining operation can flow freely through the interior passageway 110 of the guide sleeve 108.

Figure 6:
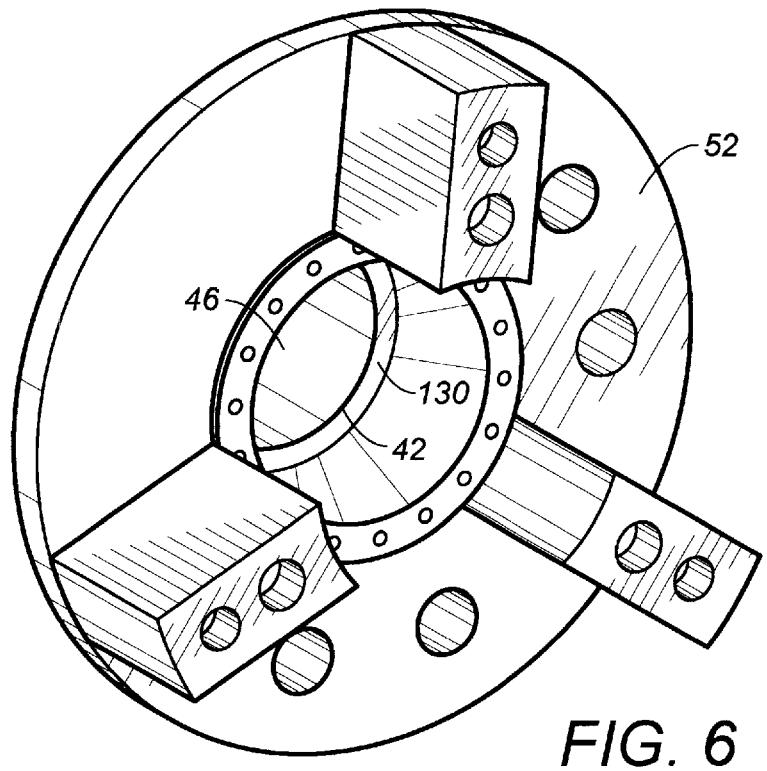
FIG. 6 is a perspective view showing a form of the present invention without the tapered sleeve.
Figure 7:
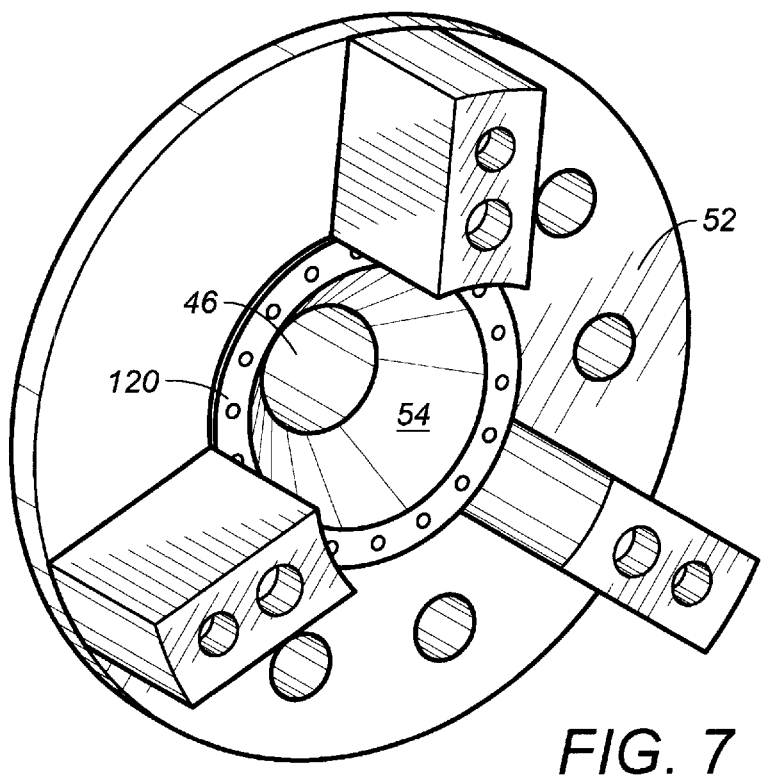
FIG. 7 shows the tapered sleeve as positioned within the through hole of the chuck.

A tapered sleeve 120 is affixed to the chuck 52 and is affixed to the forward end 48 of the spindle 42. The tapered sleeve 120 will rotate with the rotation of the spindle 42. The tapered sleeve 120 has a wide end 122 adjacent to the jaws 106 of the chuck 52. The tapered sleeve 120 will have a narrow end 124 adjacent to the forward end 112 of the guide sleeve 108. The tapered sleeve 120 will prevent any chips from becoming lodged at the step-and-groove associated at the boundary surface between the chuck 52 and the through hole 46 of the spindle 42. Such a step-and-groove 130 is illustrated in FIG. 6. This step-and-groove 130 is at the boundary surface between the chuck 52 and the main spindle through hole 46. Some of the chips or shavings which would be flushed by the high pressure of the high pressure coolant lines 76 could stick in this step-and-groove 130. FIG. 7 shows how the use of tapered sleeve 120 avoids the problems associated with the step-and-groove 130. The tapered sleeve 120 is fitted into the chuck 52 in the area of the through hole 54. This will extend so as to eliminate the step-and-groove 130 (as shown in FIG. 6) at the boundary surface between the chuck 52 and the through hole 46 of the spindle 42. By using the apparatus 40 of the present invention and the force of the high pressure coolant, one hundred percent of the chips will pass through the through hole 54 of the chuck 52 and through the through hole 46 of the spindle 42. A complete removal of the chips will occur from the rear end 114 of the sleeve 108. As a result, damage to the cutting tool 62 is effectively prevented. The tapered sleeve 120 is configured so as to fit flush against the wall of the through hole 54 of the chuck 52.

Figure 4:
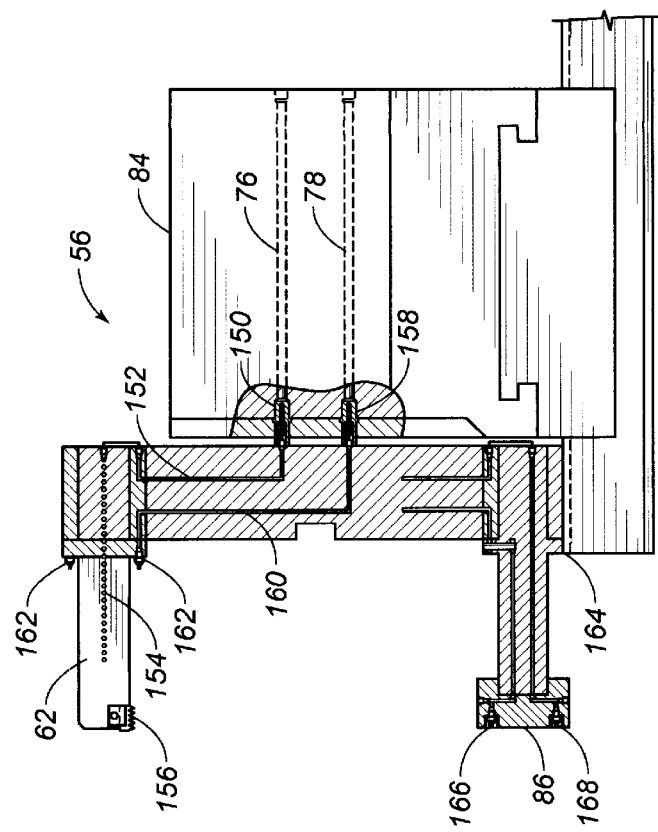
FIG. 4 is a cross-sectional view showing the cutting tool and coolant system as used in the present invention.

FIG. 4 is an isolated view of the cutting system 56 associated with the apparatus 40 of the present invention. The cutting system 56 includes a suitable turret 84 which is rotatable and has various stations. As can be seen in FIG. 4, the high pressure coolant line 76 will extend so as to be connected to fittings 150. A fluid passageway 152 will extend upwardly into the cutting tool 62 so as to have an outlet 154 adjacent to the cutting insert 156. As a result, high pressure coolant is forced toward the through hole 54 of the chuck 52 and toward the interface between the cutting insert 156 and the workpiece 58.

The low pressure coolant line 78 is connected to a fitting 158. Fluid line 160 will extend upwardly so as to have a plurality of outlets 162 opening around the periphery of the cutting tool 62. As such, a flood of low pressure coolant is released around the periphery of the cutting tool 62.

FIG. 4 shows the chip removal tool 86 extending outwardly from another station 164 of the turret 84. The chip removal tool 86 will have a high pressure outlet 166 and a plurality of low pressure outlets 168 formed around the periphery of the chip removal tool 86. The turret 84 can be suitably rotated so that the station associated with the chip removal tool 86 is aligned with the interior of the workpiece 58 so as to particularly direct either high pressure coolant or low pressure coolant into this interior area.

Figure 5:
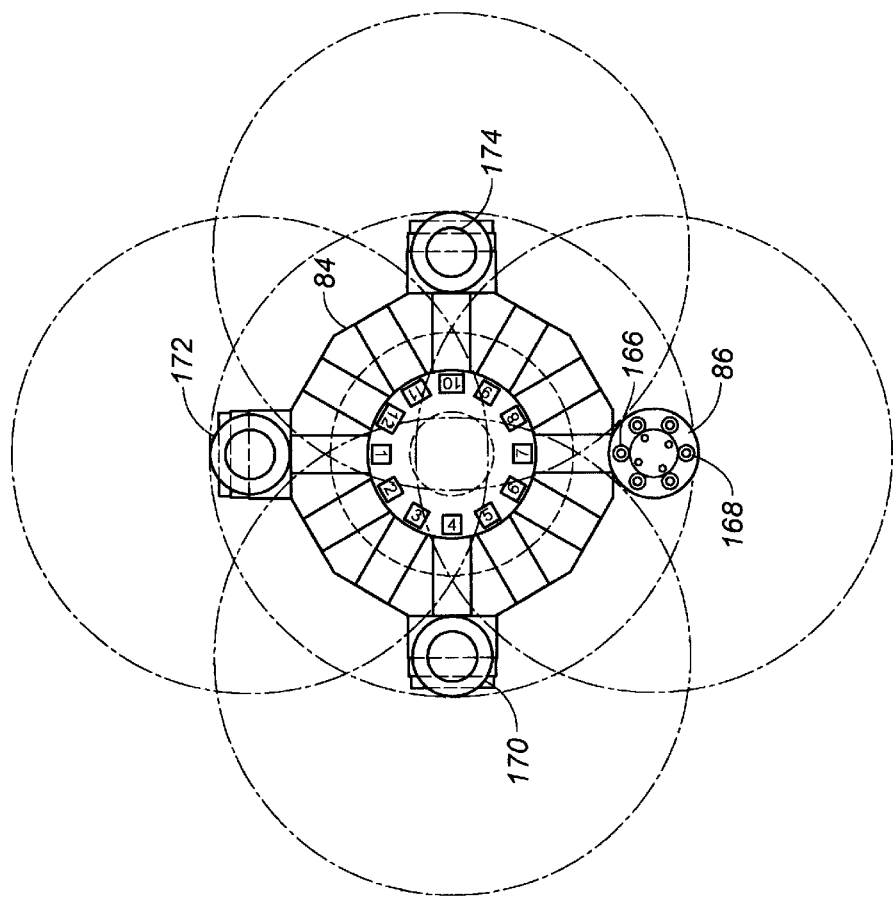
FIG. 5 is an end view showing the cutting tool and coolant system of the present invention as mounted on a rotatable turret.

FIG. 5 shows the operation of the turret 84. As can be seen, various cutting tools 170, 172 and 174 can be affixed within various stations associated with the turret 84. Turret 84 is illustrated as having a total of twelve stations. The positioning of the various tools relative to the stations will be in accordance with the desired machining operations. The chip removal tool 86 is illustrated as having a plurality of nozzles 168 representing the various outlets of the low pressure coolant line 78. One or more of the nozzles 166 can be for the delivery of high pressure coolant.

Figure 8:
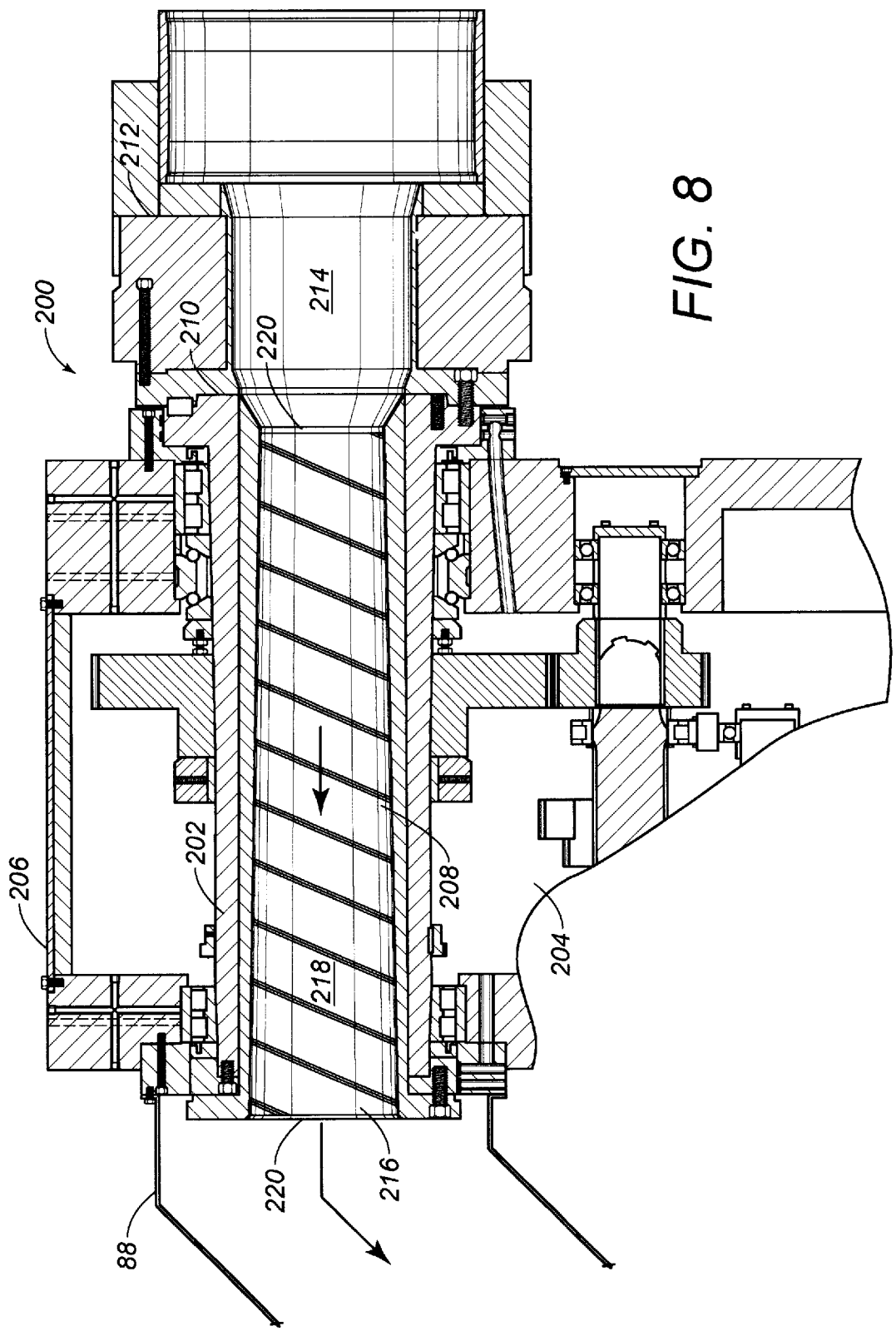
FIG. 8 is a cross-sectional view of an alternative embodiment of the present invention.

FIG. 8 shows an alternative embodiment 200 of the present invention. In the embodiment shown in FIG. 8, the spindle 202 is rotatably mounted within the frame 204 of a lathe 206. The spindle 202 has a through hole 208 formed therein. The spindle 202 is connected at its forward end 210 to the chuck 212. The chuck 212 has a through hole 214 axially aligned with the through hole 208 of spindle 202.

Unlike the prior embodiment of the present invention, the spindle 202 does not include the guide sleeve 108. In this alternative form of the present invention, the inner wall 216 of the spindle 202 has a spiral-shaped pathway 218 extending therearound and therealong. The through hole 208 of spindle 202 has a narrow end 220 adjacent to the chuck 212 and a wide end 222 adjacent to the discharge chute 88. The spiral-shaped pathway 218, along with the tapering of the spindle 202, will cause any metal chips produced during the machining operation to be urged toward the discharge end 220 and into the chute 88. The use of the spiral-shaped pathway 218 relies upon the centrifugal force between the chips and the wall of the through hole 208 of spindle 202 to move the chips toward the discharge end 220. As used herein, the "pathway" can be a channel formed in the inner wall of the spindle. Alternatively, a spiral-shaped or worm-shaped ridge configuration may be used. In other words, the spiral or worm-shaped ridge may extend along the inner wall of the spindle 202 so as to cause the movement of the chips in the manner described hereinbefore.

In the present invention, the high pressure coolant system having high pressure coolant lines and low pressure coolant lines provides the requisite force so as to urge the chips and shavings formed during the internal cutting production to be discharged from the rear end of the spindle. The use of the tapered sleeve and the work-holding chuck provides the smoothness at the boundary surface between the through holes of the chuck and the main spindle so that the chips or shavings can pass smoothly through the through holes of the chuck and the spindle. The present invention eliminates the need for the operator of the lathe to shut down the machine for the removal of the chips. As a result, productivity of the machining operation is greatly improved. Additionally, the worker does not have to reach into the interior of the workpiece to removed accumulated spiral-shaped strands of chips and shavings. As a result, the safety of the worker is improved.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. An apparatus for removing chips from a lathe comprising:
   a spindle having a horizontal through hole formed therein, said through hole opening at a forward end and a rear end of said spindle, said through hole of said spindle being tapered so as to have a narrow end at said forward end of said spindle and a wide end at said rear end of said spindle, said through hole of said spindle having a wall therearound, said wall having a spiraled pathway extending from said forward end toward said rear end;
   a chuck having a through hole formed therein, said chuck affixed adjacent said forward end of said spindle, said through hole of said chuck being axially aligned with said through hole of said spindle;
   a cutting means cooperative with said chuck for removing metal chips from a workpiece mounted in said chuck; and
   a coolant line means connected to said cutting means and directed generally toward said through hole of said chuck for driving the metal chips through said through hole of said spindle and outwardly of said rear end of said spindle.

2. The apparatus of claim 1, said cutting means comprising:
   a turret; and
   a cutting tool affixed to a station of said turret, said coolant line means connected to said turret and extending toward said cutting tool, said coolant line means having an outlet adjacent said cutting tool.

3. The apparatus of claim 2, said cutting means further comprising:
   a chip removal tool affixed to another station of said turret, said coolant line means having another outlet at said chip removal tool, said turret being rotatable such that said chip removal tool is positioned adjacent said through hole of said chuck.

4. A method of removing chips produced during cutting operations on a lathe comprising:
   forming a horizontal through hole in a spindle of the lathe;
   affixing a guide sleeve within said through hole of said spindle;
   attaching a high pressure coolant line adjacent a cutting tool of the lathe so as to have an outlet directed generally toward said through hole of said spindle;
   attaching a low pressure coolant line adjacent said cutting tool so as to have an outlet directed generally toward said through hole of said spindle;
   pumping coolant through said high pressure coolant line such that said high pressure coolant line releases liquid at a pressure of no less than 1000 p.s.i.;
   pumping coolant through said low pressure coolant line such that said low pressure coolant line releases liquid at a pressure of between 100 and 1000 p.s.i.;
   cutting chips by said cutting tool from a workpiece affixed to a chuck, said chuck having a through hole aligned with said through hole of said spindle, the step of cutting chip comprising rotating said spindle, said guide sleeve being stationary during the rotation of said spindle; and
   driving the chips through said through hole of said chuck and through said through hole of said spindle by a force of the liquid released from said high pressure coolant line and said low pressure coolant lines.

5. The apparatus of claim 4, further comprising:
   discharging the chips from an end of said spindle opposite said chuck.

6. The method of claim 4, said step of forming a through hole comprising:
   forming a tapered through hole in said spindle such that said tapered through hole has a narrow end adjacent the chuck and a wide end at an end of said spindle opposite the chuck.

7. The method of claim 4, further comprising:
   affixing a workpiece to said chuck;
   affixing said coolant lines to a station of a turret;
   rotating said workpiece and said chuck; and
   moving said turret toward said workpiece such that said cutting tool removes chips from an interior diameter of the workpiece.

8. The method of claim 7, further comprising:
   affixing a chip removal tool to another station of said turret, said chip removal tool having additional coolant lines having an outlet thereon;
   moving said turret and said chip removal tool such that said chip removal tool is interior of said workpiece; and
   pumping liquid through said additional coolant line and outwardly of said chip removal tool so as to drive chips through said through hole of said spindle.

9. The method of claim 4, further comprising:
   affixing a tapered sleeve within a through hole of said chuck, said tapered sleeve having an end adjacent a forward end of said guide sleeve, said tapered sleeve rotatable within said spindle.

* * * * *